United States Patent
Nagatani et al.

(10) Patent No.: US 6,302,082 B1
(45) Date of Patent: Oct. 16, 2001

(54) IGNITION TIMING CONTROL SYSTEM FOR INTERNAL COMBUSTION ENGINE

(75) Inventors: Shuji Nagatani; Masahiro Sato; Minoru Torii, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,146

(22) Filed: Apr. 19, 2000

(30) Foreign Application Priority Data

Apr. 20, 1999 (JP) .................................................. 11-111931

(51) Int. Cl.$^7$ ...................................................... F02D 5/145
(52) U.S. Cl. ........................................ 123/305; 123/406.47
(58) Field of Search ................................ 123/305, 406.47

(56) References Cited

U.S. PATENT DOCUMENTS

| | | | |
|---|---|---|---|
| 5,718,203 | * | 2/1998 | Shimada et al. ................. 123/406.47 |
| 5,975,047 | * | 11/1999 | Kamura et al. ....................... 123/305 |
| 6,058,906 | * | 5/2000 | Yoshino ........................... 123/406.47 |
| 6,062,190 | * | 5/2000 | Nakamina ............................. 123/305 |
| 6,089,206 | * | 7/2000 | Suzuki et al. ......................... 123/305 |
| 6,173,692 | * | 1/2001 | Hellmich et al. ..................... 123/305 |

FOREIGN PATENT DOCUMENTS

| | | |
|---|---|---|
| 4-37264 | 6/1992 | (JP) . |
| 9-4499 | 1/1997 | (JP) . |

\* cited by examiner

*Primary Examiner*—Erick Solis
(74) *Attorney, Agent, or Firm*—Arent Fox Kintner Plotkin & Kahn, PLLC

(57) ABSTRACT

An ignition timing control system for a direct injection spark ignition internal combustion engine which is operated at an ultra-lean burn combustion or at a pre-mixture charged combustion. In the system, a desired fuel injection end timing at which injection of the determined fuel injection amount should be ended is determined. Then, the difference between the desired fuel injection end timing and the ignition timing is calculated and is determined whether the difference is less than a predetermined value (crank angle margin), and the ignition timing is corrected by the predetermined value when the difference is determined to be less than the predetermined value, thereby enabling to prevent the overlapping of the fuel injection end timing and the ignition timing from happening and avoiding the problem of misfiring or residual of unburned fuel in the cylinder from occurring.

10 Claims, 3 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for an internal combustion engine, more particularly to an ignition timing control system for a direct injection spark ignition engine, in which gasoline fuel is directly injected into the combustion chamber of the engine.

2. Description of the Related Art

In the control system of internal combustion engines, it is well-known to determine the fuel injection amount and the ignition timing based on the engine speed and engine load, for example, from Japanese Laid-Open Patent Application No. Hei 9 (1997)-4499. The system in this prior art has a dual-spark ignition coil which is connected to two cylinders whose operating cycles are 360° out of phase with each other, in which it is determined whether the electric discharging period after ignition and the fuel injection period are overlapped with each other in the associated non-combustion cylinder (ignited in the exhaust stroke) and if the result is affirmative, the fuel injection start timing is delayed until the electric discharging has been finished.

Aside from the above, a direct injection spark ignition engine has recently been proposed in which gasoline fuel is directly injected into the combustion chamber such that an ultra-lean burn combustion or a stratified combustion (in an ultra lean air/fuel ratio) or the pre-mixture charged combustion (in a uniform air/fuel ratio) occurs in the engine as is disclosed in, for example, Japanese Patent Publication No. Hei 4 (1992) - 37264.

The ignition timing is normally set to a crank angular point at which the injected fuel has atomized (vaporized) and is combustible. However, in the direct injection spark ignition engine, since fuel injection is conducted in the compression stoke when the engine is operated at the ultra-lean burn combustion, the fuel injection end timing and the ignition timing are likely to overlap each other. This overlapping may lead to misfiring or to residual of unburned fuel such as HC (hydrocarbon) in the cylinder.

The aforesaid prior art (mentioned in Japanese Laid-Open Patent Application No. Hei 9 (1997) - 4499) aimed to overcome problems including the engine torque drop due to preignition caused by the overlapping of the electric discharging period after ignition and the fuel injection period in the non-combustion cylinder. Thus, this prior art does not solve the problem of overlapping of the fuel injection end timing and the ignition timing.

SUMMARY OF THE INVENTION

An object of the present invention is therefore to provide an ignition timing control system for an internal combustion engine, more particularly for a direct injection spark ignition engine which can prevent the overlapping of the fuel injection end timing and the ignition timing from happening, thereby avoiding the problem of misfiring or residual of unburned fuel in the cylinder from occurring.

This invention achieves this object by providing a system for controlling an ignition timing for a direct injection spark ignition internal combustion engine which is operated at an ultra-lean burn combustion or at a pre-mixture charged combustion, comprising; engine operating condition detecting means for detecting operating conditions of the engine at least including an engine speed and an engine load; fuel injection amount determining means for determining a fuel injection amount based at least on the detected engine speed and the engine load of the engine operating conditions; fuel injecting means for injecting fuel based on the determined fuel injection amount into a cylinder of the engine; ignition timing determining means for determining an ignition timing based at least on the detected engine speed and the engine load of the engine operating conditions; desired fuel injection end timing determining means for determining a desired fuel injection end timing at which injection of the determined fuel injection amount should be ended such that the fuel injecting means ends the fuel injection in response to the determined desired fuel injection end timing; margin determining means for determining a difference between the determined desired fuel injection end timing and the determined ignition timing and for determining whether the difference is less than a predetermined value indicative of margin; ignition timing correcting means for correcting the determined ignition timing by the predetermined value when the difference is determined to be less than the predetermined value; and ignition means for igniting an air-fuel mixture made of the injected fuel mixed with air based at least on one of the determined ignition timing and the corrected ignition timing.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

Embodiments of the present invention will now be explained with reference to the drawings.

Figure 1:
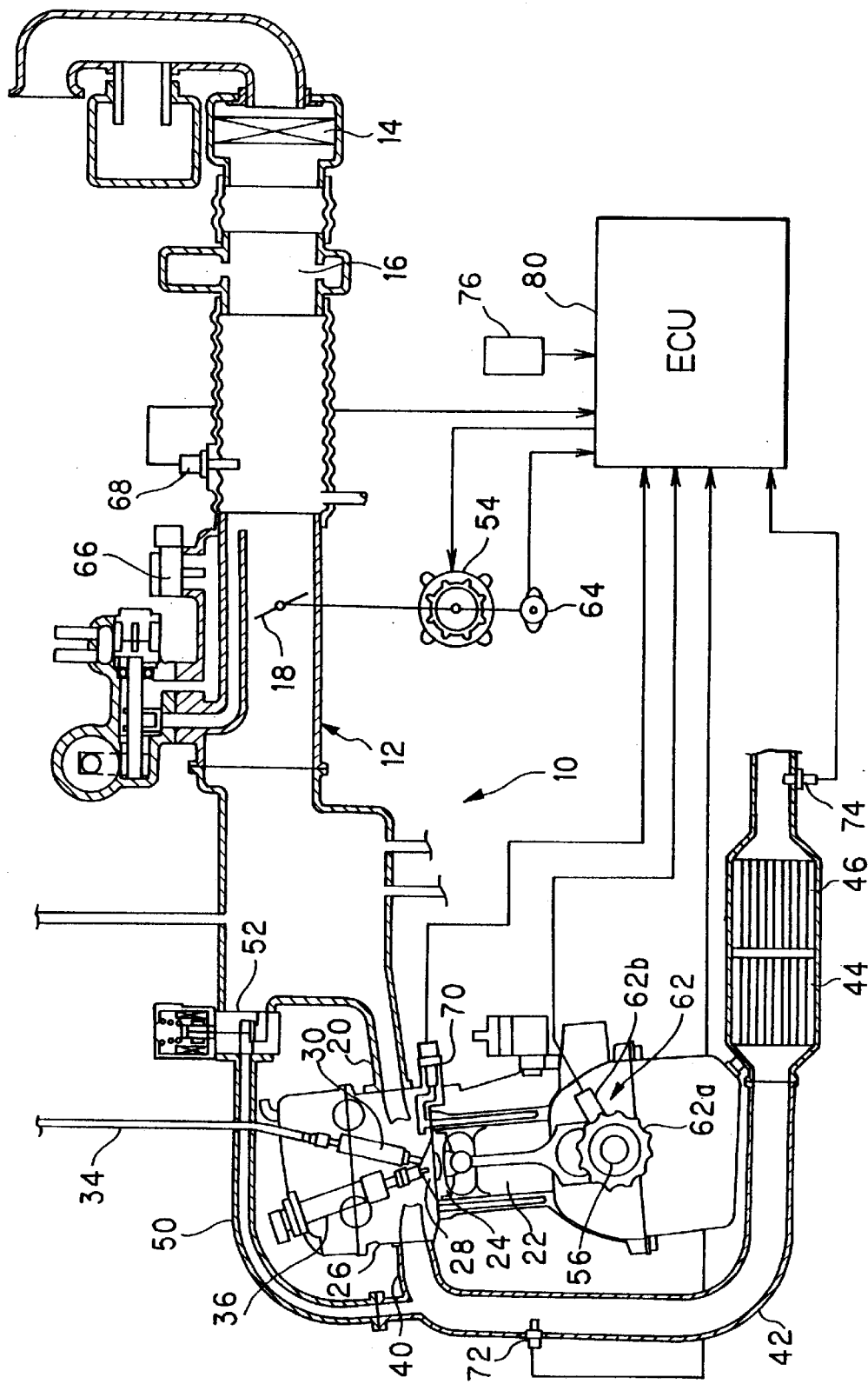
FIG. 1 is an overall schematic view showing an ignition timing control system for an internal combustion engine according to an embodiment of the invention.

FIG. 1 is an overall schematic view of an ignition timing control system for an internal combustion engine according to an embodiment of the invention.

Reference numeral 10 in this figure designates an OHC in-line four-cylinder internal combustion engine. Air drawn into an air intake pipe 12 through an air cleaner 14 mounted on its far end flows through a surge tank 16 and an intake manifold 20, while the flow thereof is adjusted by a throttle valve 18, to two intake valves (neither shown) of respective one of the first to fourth cylinders 22 (for brevity of illustration, only one is shown in the figure).

Each cylinder 22 has a piston 24 which is displaceable in the cylinder 22. The top of the piston 24 is recessed such that a combustion chamber 28 is formed in a space defined by the recessed cylinder top and the inner wall of a cylinder head (and the inner wall of the cylinder 22). A fuel injector 30 is provided in the vicinity of the center of the ceiling of the combustion chamber 28. The fuel injector 30 is connected to a fuel supply pipe 34 and is supplied with pressurized fuel (gasoline) from a fuel tank (not shown) pumped by a pump (not shown) and injects fuel directly into the combustion chamber 28 when opened. The injected fuel mixes with the air and forms the air-fuel mixture.

A spark plug 36 is provided in the vicinity of the fuel injector 30 which is supplied with electric energy from an ignition system including an ignition coil (neither shown) and ignites the air-fuel mixture at a predetermined ignition timing in the order of the first, the third, the fourth and the second cylinder. The resulting combustion of the air-fuel mixture drives down the piston 24.

Thus, the engine 10 is a direct injection spark ignition engine in which the gasoline fuel is directly injected into the combustion chamber 28 of respective cylinders 22 through the fuel injector 30.

The exhaust gas produced by the combustion is discharged through two exhaust valves (neither shown) into an exhaust manifold 40, from where it passes through an exhaust pipe 42 to a catalytic converter 44 (for removing NOx in the exhaust gas) and a second catalytic converter 46 (three-way catalyst for removing NOx, CO and HC in the exhaust gas) to be purified and then flows out of the engine 10.

The exhaust pipe 42 is connected, at a location downstream of the confluence point of the exhaust manifold 40, to the air intake pipe 12 by an EGR conduit 50 so as to recirculate the exhaust gas partially in the operation of EGR (Exhaust Gas Recirculation). An EGR control valve 52 is provided at the EGR conduit 50 to regulate the amount of EGR.

The throttle valve 18 is not mechanically linked with an accelerator pedal (not shown) installed at the floor of a vehicle operator seat (not shown), but is connected to a stepper motor 54 to be driven by the motor to open/close the air intake pipe 12. The throttle valve 18 is operated in such a DBW (Drive-By-Wire) fashion.

The piston 24 is connected to a crankshaft 56 to rotate the same. A crank angle sensor 62 is installed in the vicinity of the crankshaft 56, which comprises a pulser 62a fixed to the rotating crankshaft 56 and an electromagnetic pickup 62b fixed in an opposing stationery position. The crank angle sensor 62 generates a cylinder discrimination signal (named "CYL") once every 720 crank angular degrees, a signal (named "TDC"(Top Dead Center)) at a predetermined BTDC crank angular position and a unit signal (named "CRK") at 30 crank angular degrees obtained by dividing the TDC signal intervals by six.

A throttle position sensor 64 is connected to the stepper motor 54 and generates a signal indicative of the opening degree of the throttle valve 18 (named "TH"). A manifold absolute pressure (MAP) sensor 66 is provided in the air intake pipe 12 downstream of the throttle valve 18 and generates a signal indicative of the engine load, more precisely the absolute manifold pressure (named "PBA") generated by the intake air flow there through a conduit (not shown).

An intake air temperature sensor 68 is provided at a location upstream of the throttle valve 18 (close to the air cleaner 14) and generates a signal indicative of the temperature of intake air (named "TA"). And a coolant temperature sensor 70 is installed in the vicinity of the cylinder 22 and generates a signal indicative of the temperature of an engine coolant (named "TW").

Further, a universal (or wide range) sensor (air-fuel ratio sensor) 72 is installed at the exhaust pipe 42 at a position upstream of the catalytic converters 44, 46 and generates a signal indicative of the exhaust air/fuel ratio that changes linearly in proportion to the oxygen concentration in the exhaust gas. This sensor 72 is hereinafter referred to as "LAF" sensor. In addition, an $O_2$ sensor (air-fuel ratio sensor) 74 is provided at a position downstream of the catalytic converters 44, 46 and generates a signal which changes each time the exhaust air/fuel turns from lean to rich and vice versa with respect to a stoichiometric air/fuel ratio.

Furthermore, an accelerator position sensor 76 is provided in the vicinity of the accelerator pedal which generates a signal indicative of the position (opening degree) of the accelerator pedal (named "θAP").

The outputs of the sensors are sent to an ECU (Electronic Control Unit) 80. The ECU 80 comprises a microcomputer having a CPU, a ROM, a RAM (all not shown), etc. The CRK signal generated by the crank angle sensor 62 is counted by a counter (not shown) in the ECU 80 and the engine speed NE is detected or calculated.

The operation of the ignition timing control system for an internal combustion engine according to the embodiment will be explained.

In the ECU 80, the CPU determines or calculates the fuel injection amount and ignition timing based on the detected parameters obtained by the sensors and including the detected engine speed NE, as will be explained below.

The operation of the CPU, specifically, the operation of the ignition timing control system for an internal combustion engine according to the embodiment will therefore be explained.

Figure 2:
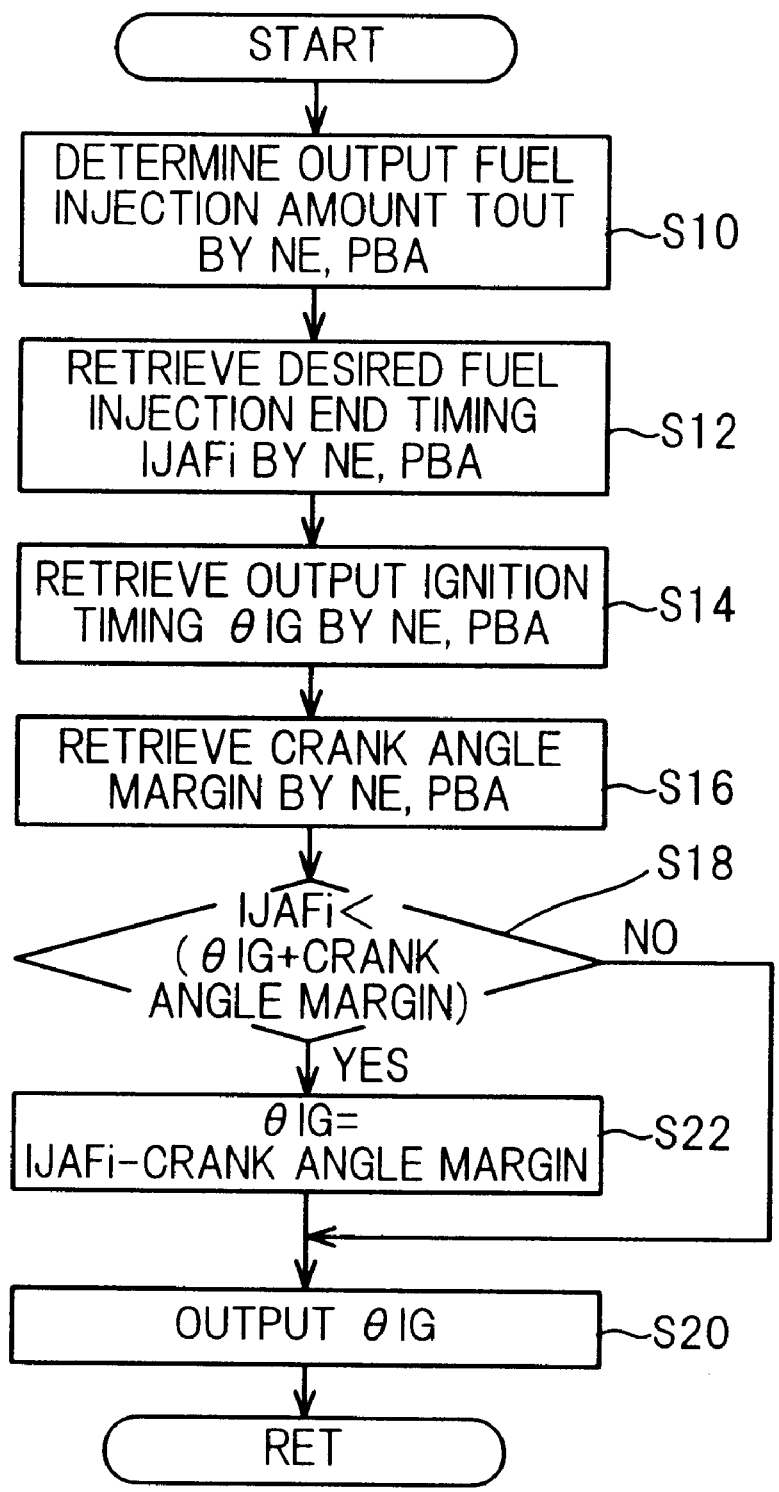
FIG. 2 is a flow chart showing the operation of the system illustrated in FIG. 1.

FIG. 2 is a flow chart showing the operation of the system. The program of this flow chart is executed at a predetermined BTDC crank angular position.

The program begins in S10 in which an output fuel injection amount (named "TOUT") is determined or calculated using the engine speed NE and the manifold absolute pressure PBA (engine load).

Explaining the determination of the fuel injection amount more specifically, the CPU determines a desired torque (named "PME") to be generated by the engine 10 based on the detected engine speed NE and the detected accelerator position θAP. The CPU then determines or calculates a desired air/fuel ratio KCMD to be supplied to the engine 10 based on the determined desired torque PME and the detected engine speed NE.

Parallel with the above, the CPU determines or calculates a basic injection amount (named "TI") based on the detected engine speed NE and the manifold absolute pressure PBA. Based on the determined basic injection amount, it then determines the output injection amount TOUT as follow. The amounts TI and TOUT are determined in terms of the fuel injector opening period.

$$TOUT = TI \times KCMDM \times KEGR \times KLAF \times KT + TT$$

In the above, KCMDM is a desired air/fuel ratio correction coefficient and is determined by correcting the desired air/fuel ratio KCMD by the charging efficiency. The values KCMD and KCMDM are, in fact, determined in terms of the equivalence ratio.

In the above, KEGR is a correction coefficient for correcting the disturbance caused by EGR and is determined based on the desired torque PME and the engine speed NE. KLAF is a feedback correction coefficient and is determined based on the output of the LAF sensor 72. KT is the product of other correction factors in multiplication form and TT is the sum of other correction factors in additive form (and subtraction form).

As regards the desired air/fuel ratio KCMD, the CPU determines it such that the actual air/fuel ratio in the vicinity of the spark plug 36 falls within a range from 12.0: 1 to 15.0:

1, irrespective of the engine load, while the actual average air/fuel ratio (averaged air/fuel ratio throughout the cylinder 22) falls within a range from 12.0: 1 to 15.0: 1 at a high engine load, within a range exceeding thereof but up to 22.0: 1 at a medium engine load, and within a range exceeding thereof but up to 60.0: 1 at a low engine load.

Moreover, the CPU controls to inject fuel during the intake stroke at a high or medium engine load, while controlling to inject fuel during the compression stroke at a low engine load. The injected fuel mixes with the intake air and is ignited, resulting in the ultra-lean burn combustion (DISC (Direct Injection Stratified Charged) combustion) or the pre-mixture charged combustion.

The program then proceeds to S12 in which a desired fuel injection end timing (point) IJAFi is determined in terms of crank angle by retrieving mapped data (whose characteristics are not shown) using the detected engine speed NE and the engine load (manifold absolute pressure PBA) as address data.

The program then proceeds to S14 in which an output ignition timing (point) $\theta$IG is determined or calculated. This is done by retrieving a basic ignition timing (point) from mapped data (whose characteristics are not shown) similarly using the detected engine speed NE and the manifold absolute pressure PBA (engine load) as address data, and by correcting the basic ignition timing by the other parameters such as the engine coolant temperature TW. It should be noted that, as mentioned above, the ignition timing is set to a crank angular point at which the injected fuel has atomized (vaporized) and is combustible.

Figure 3:
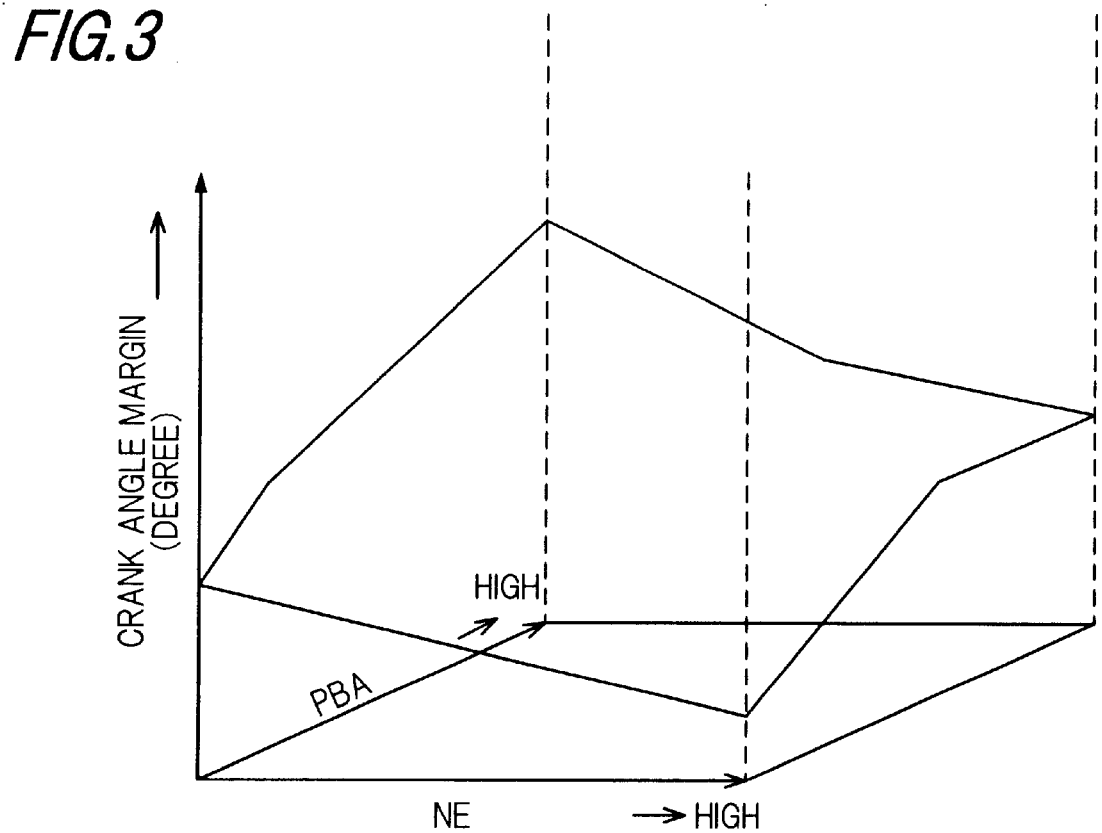
FIG. 3 is a graph showing characteristics of a crank angle margin referred to in the flow chart of FIG. 2.

The program then proceeds to S16 in which a crank angle margin (a predetermined value indicative of margin) is determined or calculated in terms of crank angle by retrieving mapped data (whose characteristics are shown in FIG. 3) using the detected engine speed NE and the engine load (manifold absolute pressure PBA) as address data.

The program then proceeds to S 18 in which the sum of the output ignition timing $\theta$IG and the crank angle margin is determined or calculated and it is determined whether the desired fuel injection end timing IJAFi is less than the sum.

In the flow chart, the advance direction is defined to be positive. Therefore, as illustrated in FIG. 4, it is determined here whether the sum is less than the desired fuel injection end timing IJAFi in the advanced direction in crank angle, specifically, it is determined whether the difference (between the desired fuel injection end timing IJAFi and the output ignition timing $\theta$IG) is less than the crank angle margin, more specifically, it is determined whether the crank angle margin can exist between the desired fuel injection end timing IJAFi and the output ignition timing $\theta$IG.

Explaining this, since fuel injection is conducted in the compression stroke in the direct injection spark ignition engine 10 when it is operated at the ultra-lean burn combustion, the desired fuel injection end timing IJAFi shifts to the retarded direction. As a result, the fuel injection end timing and the ignition timing are likely to overlap each other, thereby leading to misfiring or to residual of unburned fuel in the cylinder.

In view of the above, the system is configured to merely prevent the overlapping of the desired fuel injection end timing IJAFi and the output ignition timing $\theta$IG from occurring, and to control the ignition timing in such a way that the crank angle margin can exit therebetween such that the aforesaid problem due to the overlapping can surely be avoided.

As illustrated in FIG. 3, the crank angle margin is predetermined such that it decreases with increasing engine speed NE and increases with increasing engine load (manifold absolute pressure PBA). Thus, the crank angle margin is predetermined relative to the basic engine operation parameters. This can make the crank angle margin to a necessary and minimum extent at every engine operation conditions, while surely preventing the aforesaid problem from happening.

Figure 4A:
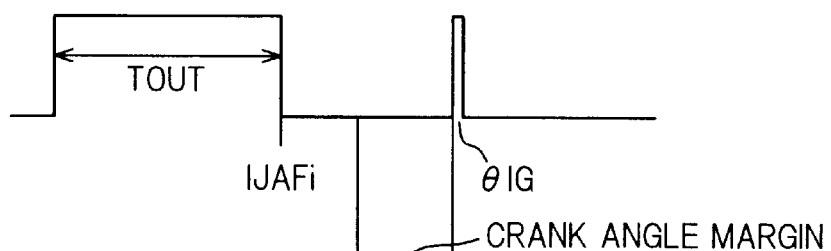
FIGS. 4A and 4B are time charts showing the operation illustrated in FIG. 2.

In the case illustrated in FIG. 4A, since the crank angle margin is present between the desired fuel injection end timing IJAFi and the output ignition timing $\theta$IG, the result in S 18 is negative and the program proceeds to S20 in which the output ignition timing $\theta$IG is output. With this, the current supply is initiated in a primary ignition coil (not shown) through an ignitor (not shown) and the supplied current is then cut off at the output ignition timing $\theta$IG such that a high voltage is generated in the secondary ignition coil (not shown) which is supplied, through an ignition distributor (not shown), to the spark plug 36 of the cylinder 22 concerned.

Figure 4B:
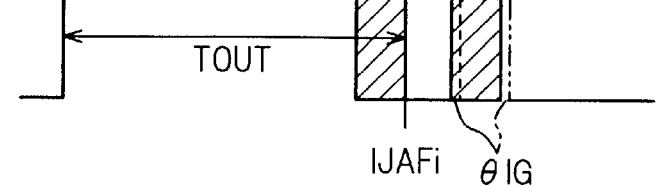

On the other hand, the desired fuel injection end timing IJAFi may sometimes shift to the retarded direction such that, as illustrated in FIG. 4B, the crank angle margin can not exist therebetween.

If this happens, the result in S18 is affirmative and the program proceeds to S22 in which the crank angle margin is subtracted from the desired fuel injection end timing IJAFi to calculate the difference therebetween and the output ignition timing $\theta$IG is set to the difference. Specifically, as illustrated by phantom lines in FIG. 4B, the output ignition timing $\theta$IG is corrected to be shifted to the retarded direction by the crank angle margin.

Having been configured in the foregoing manner, the system according to the embodiment can prevent the overlapping of the desired fuel injection end timing IJAFi and the output ignition timing $\theta$IG from occurring, by controlling the ignition timing in such a way that the crank angle margin can exit therebetween such that the aforesaid problem due to the overlapping can surely be avoided.

Furthermore, since the system is configured not to correct the desired fuel injection end timing IJAFi, the fuel injection can be terminated at the expected point.

The system is thus configured to have a system for controlling an ignition timing for an internal combustion engine (10), including; engine operating condition detecting means (ECU 80, 62, 66) for detecting operating conditions of the engine at least including an engine speed (NE) and an engine load (PBA); fuel injection amount determining means (ECU 80, S 10) for determining a fuel injection amount (TOUT) based at least on the detected engine speed (NE) and the engine load (PBA) of the engine operating conditions; fuel injecting means (ECU 80, 30) for injecting fuel based on the determined fuel injection amount into a cylinder (22) of the engine (10); ignition timing determining means (ECU 80, S12) for determining an ignition timing ($\theta$IG) based at least on the detected engine speed (NE) and the engine load (PBA) of the engine operating conditions; and ignition means (ECU 80, 36, S20) for igniting an air-fuel mixture made of the injected fuel mixed with air.

In the system, the engine (10) is a direct injection spark ignition engine which is operated at an ultra-lean burn combustion or at a pre-mixture charged combustion; and the system includes: desired fuel injection end timing determining means (ECU 80, S12) for determining a desired fuel injection end timing (IJAFi) at which injection of the determined fuel injection amount should be ended such that the fuel injecting means ends the fuel injection in response to the determined desired fuel injection end timing; margin determining means (ECU 80, S18) for determining a difference between the determined desired fuel injection end timing and the determined ignition timing and for determining whether the difference is less than a predetermined value indicative of margin (crank angle margin); and ignition timing correcting means (ECU 80, S22) for correcting the determined ignition timing by the predetermined value when the difference is determined to be less than the predetermined value.

In the system, the predetermined value is based at least on the detected engine speed (NE) and the engine load (PBA) of the engine operating conditions (ECU 80, S16), specifically, the predetermined value is determined to be decreased with increasing engine speed (NE), more specifically, the predetermined value is determined to be increased with increasing engine load (PBA). Then the predetermined value is determined to be a value relating to crank angles.

In the above, "at least" means that any other parameter(s) may instead be used.

It should be noted in the above, although the crank angle margin is determined by map retrieval, it is alternatively possible to determine it to a fixed value.

It should also be noted in the above, although the crank angle margin is determined in terms of crank angle, it is alternatively possible to determine it in terms of time.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an ignition timing for a direct injection spark ignition internal combustion engine which is operated at an ultra-lean burn combustion or at a pre-mixture charged combustion, comprising;

engine operating condition detecting means for detecting operating conditions of the engine at least including an engine speed and an engine load;

fuel injection amount determining means for determining a fuel injection amount based at least on the detected engine speed and the engine load of the engine operating conditions;

fuel injecting means for injecting fuel based on the determined fuel injection amount into a cylinder of the engine;

ignition timing determining means for determining an ignition timing based at least on the detected engine speed and the engine load of the engine operating conditions;

desired fuel injection end timing determining means for determining a desired fuel injection end timing at which injection of the determined fuel injection amount should be ended such that the fuel injecting means ends the fuel injection in response to the determined desired fuel injection end timing;

margin determining means for determining a difference between the determined desired fuel injection end timing and the determined ignition timing and for determining whether the difference is less than a predetermined value indicative of margin;

ignition timing correcting means for correcting the determined ignition timing by the predetermined value when the difference is determined to be less than the predetermined value; and ignition means for igniting an air-fuel mixture made of the injected fuel mixed with air based at least on one of the determined ignition timing and the corrected ignition timing.

2. A system according to claim 1, wherein the predetermined value is based at least on the detected engine speed and the engine load of th engine operating conditions.

3. A system according to claim 2, wherein the predetermined value is determined to be decreased with increasing engine speed.

4. A system according to claim 2, wherein the predetermined value is determined to be increased with increasing engine speed.

5. A system according to claim 1, wherein the predetermined value is determined to be a value relating to crank angles.

6. A method of controlling an ignition timing for a direct injection spark ignition internal combustion engine which is operated at an ultra-lean burn combustion or at a pre-mixture charged combustion, comprising the steps of;

detecting operating conditions of the engine at least including an engine speed and an engine load;

determining a fuel injection amount based at least on the detected engine speed and the engine load of the engine operating conditions;

injecting fuel based on the determined fuel injection amount into a cylinder of the engine;

determining an ignition timing based at least on the detected engine speed and the engine load of the engine operating conditions;

determining a desired fuel injection end timing at which injection of the determined fuel injection amount should be ended such that the step of fuel injecting ends the fuel injection in response to the determined desired fuel injection end timing;

determining a difference between the determined desired fuel injection end timing and the determined ignition timing and for determining whether the difference is less than a predetermined value indicative of margin;

correcting the determined ignition timing by the predetermined value when the difference is determined to be less than the predetermined value; and igniting an air-fuel mixture made of the injected fuel mixed with air based at least on one of the determined ignition timing and the corrected ignition timing.

7. A method according to claim 6, wherein the predetermined value is based at least on the detected engine speed and the engine load of the engine operating conditions.

8. A method according to claim 7, wherein the predetermined value is determined to be decreased with increasing engine speed.

9. A method according to claim 7, wherein the predetermined value is determined to be increased with increasing engine speed.

10. A method according to claim 6, wherein the predetermined value is determined to be a value relating to crank angles.

* * * * *